(12) United States Patent
Goldsberry et al.

(10) Patent No.: US 12,489,175 B2
(45) Date of Patent: Dec. 2, 2025

(54) BATTERY MODULE AND A METHOD FOR COOLING A BATTERY MODULE OF AN ELECTRIC VEHICLE

(71) Applicant: BETA AIR, LLC, South Burlington, VT (US)

(72) Inventors: Nathan Goldsberry, South Burligton, VT (US); Michael Cemprola, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/588,179

(22) Filed: Feb. 27, 2024

(65) Prior Publication Data

US 2024/0250380 A1    Jul. 25, 2024

Related U.S. Application Data

(63) Continuation of application No. 18/096,454, filed on Jan. 12, 2023, now Pat. No. 11,936,063.

(51) Int. Cl.
| | |
|---|---|
| *H01M 50/583* | (2021.01) |
| *B60L 50/70* | (2019.01) |
| *B64C 29/00* | (2006.01) |
| *B64D 27/24* | (2024.01) |
| *B64D 27/34* | (2024.01) |
| *B64D 27/357* | (2024.01) |
| *B64D 33/08* | (2006.01) |
| *H01M 10/613* | (2014.01) |
| *H01M 10/625* | (2014.01) |
| *H01M 10/6568* | (2014.01) |
| *H01M 50/383* | (2021.01) |

(52) U.S. Cl.
CPC ......... *H01M 50/383* (2021.01); *B60L 50/70* (2019.02); *B64C 29/0008* (2013.01); *B64D 27/34* (2024.01); *B64D 27/357* (2024.01); *B64D 33/08* (2013.01); *H01M 10/613* (2015.04); *H01M 10/625* (2015.04); *H01M 10/6568* (2015.04); *B60L 2200/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 11,355,800 B2 | 6/2022 | Shimizu | |
| 11,936,063 B1 * | 3/2024 | Goldsberry | ............ B64D 33/08 |
| 2020/0108919 A1 * | 4/2020 | Sada | ........................ B64C 27/20 |
| 2020/0152926 A1 * | 5/2020 | Wynn | ................. H01M 50/155 |
| 2020/0287179 A1 * | 9/2020 | Wang | .................... H01M 50/30 |

(Continued)

FOREIGN PATENT DOCUMENTS

| | | | |
|---|---|---|---|
| CN | 107565078 | * | 1/2019 |
| WO | 2021140167 A1 | | 7/2021 |
| WO | 2022008743 A3 | | 3/2022 |

*Primary Examiner* — Lisa S Park
(74) *Attorney, Agent, or Firm* — Georgi Korobanov; Hoffman Warnick LLC

(57) ABSTRACT

A battery module with a cooling plate and a firewall. Battery modules may include a firewall located proximal to the plurality of battery cells and configured to absorb heat from the battery cells. The firewall may include a stack of materials. A battery module may include a cooling plate between rows of battery cells configured to cool the battery cells.

20 Claims, 10 Drawing Sheets

(56) References Cited

U.S. PATENT DOCUMENTS

| | | |
|---|---|---|
| 2021/0143492 A1 | 5/2021 | Zagrodnik |
| 2022/0021074 A1* | 1/2022 | Mabrey ............. H01M 50/3425 |
| 2022/0021090 A1* | 1/2022 | Shin .................... H01M 10/647 |
| 2023/0087017 A1* | 3/2023 | Xiao ................... H01M 50/394 |
| | | 429/120 |
| 2024/0128498 A1* | 4/2024 | Kamath ................ H01M 4/664 |

* cited by examiner

BATTERY MODULE AND A METHOD FOR COOLING A BATTERY MODULE OF AN ELECTRIC VEHICLE

FIELD OF THE INVENTION

The present invention generally relates to the field of electric vehicles. In particular, the present invention is directed to a battery module and a method for cooling a power source of an electric vehicle.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of energy source solutions.

SUMMARY OF THE DISCLOSURE

In an aspect, a battery module for an electric aircraft includes a plurality of battery cells, wherein the plurality of battery cells is configured to provide energy to an electric vehicle, a cooling plate located between the plurality of battery cells and configured to decrease a temperature of the plurality of battery cells, and a firewall located proximal to the plurality of battery cells and configured to absorb heat from the plurality of battery cells.

In another aspect, a method for cooling a power source of an electric vehicle includes providing energy, by a battery module comprising a plurality of battery cells, to an electric vehicle, decreasing, by a cooling plate located between the plurality of battery cells, a temperature of the plurality of battery cells, and absorbing heat, by a firewall located proximal to the plurality of battery cells, from the battery cells.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Systems and methods for venting an electric vehicle are provided to improve the management of an electric vehicle power source. More specifically, a battery pack may include a venting system with a vent, where a fluid may traverse through the vent to modify a temperature of a battery cell. The system also includes a firewall configured to absorb heat from the battery cells to prevent thermal runaway events.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1A:
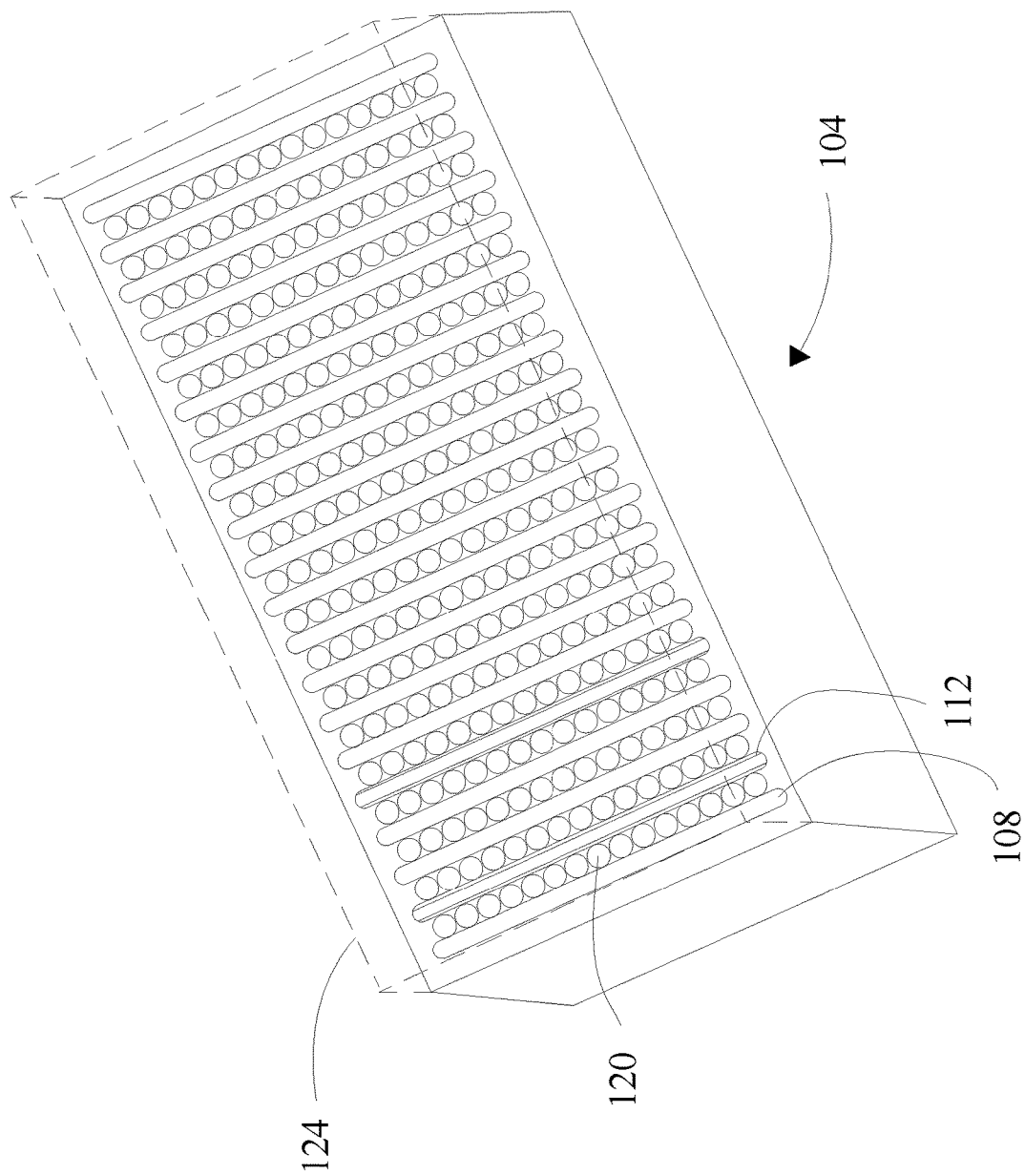
FIG. 1A is an illustration of a battery module with a firewall.

Now referring to FIG. 1A, an exemplary embodiment of a battery module 104 with a firewall is shown. Battery module 104 may include a plurality of battery cells 120. Battery module 104 and battery cells 120 are described in greater detail below. Battery cells 120 may be arranged in rows. In between each row of battery cells 120 may reside a cooling plate 108. As used herein, a "cooling plate" is a thermally conductive component designed to transfer heat from an object.

Cooling plate 108 may be composed of aluminum, copper, steel, carbon fiber, and the like. For example and without limitation, cooling plate 108 may be manufactured utilizing a plurality of manufacturing processes, such as extrusion, casting, subtractive manufacturing processes, and the like. As a further non-limiting example, cooling plate 108 may be manufactured utilizing injection molding. Injection molding may comprise injecting a liquid material, such as a liquid metal, into a mold and letting the liquid material solidify, taking the shape of the mold in a hardened form.

Cooling plate 108 may facilitate the flow of a fluid through the plurality of battery cells 120. This may be done using a cooling tube 112. As used herein, a "cooling tube" is a hollow element designed to transfer heat from an object. Cooling plate 108 may include a cooling tube 112. In a non-limiting example, one or more cooling tubes 112 may facilitate the flow of a fluid, wherein the fluid may cool battery cells 120, such that the heat generated by the battery cells 120 is stripped away. The fluid may include air, coolant, water, and the like. Coolants may include refrigerants such as R134a, and the like. Cooling tube 112 may also be composed of a similar material as cooling plate 108, such as conductive materials including, as a nonlimiting example, metals.

Still referencing FIG. 1A, a firewall 124 may be positioned proximal to the top and bottom of a battery cell 120. Firewall 124 is shown in phantom in FIG. 1A. For example, firewall 124 may be placed on top of and on the bottom of the battery cells. Only firewall 124 on top of battery cells 120 is shown in FIG. 1A. As used herein, a "firewall" is a surface used to contain products of battery destruction, including heat, flame, and debris. In some cases, firewall 124 may be configured to contain products of thermal runaway. Firewall 124 may be configured to intercept ejecta debris. As used in this disclosure, "ejecta debris" is any material that has been ejected from a battery cell 120. In some cases, ejecta may be ejected during thermal runaway of a battery cell 120. Alternatively or additionally, in some cases, ejecta debris may be ejected without thermal runaway of a battery cell 120. As used in this disclosure, a "thermal runaway" is a phenomenon in which battery cells 120 enter an uncontrollable, self-heating state. Thermal runaway may occur when battery cells 120 develop lower resistances or lower triggering voltages as the internal temperature increases. As current flow gets markedly increased, increased power dissipation may raise the temperature further. A positive feedback effect of thermal runaway may cause failure, such as inefficient battery power usage, absence of battery power, electrical explosion, or fire. In some cases, ejecta debris may include, but is not limited to, gas, shrapnel, particulates from battery cells 120, and the like. In some cases, ejecta debris may include lithium-based compounds. Alternatively or additionally, ejecta debris may include carbon-based compounds, such as without limitation carbonate esters. Ejecta debris may include matter in any phase or form, including solid, liquid, gas, vapor, and the like. In some cases, ejecta debris may undergo a phase change, for example ejecta debris may be vaporous as it is initially being ejected and then cool and condense into a solid or liquid after ejection.

Figure 1B:
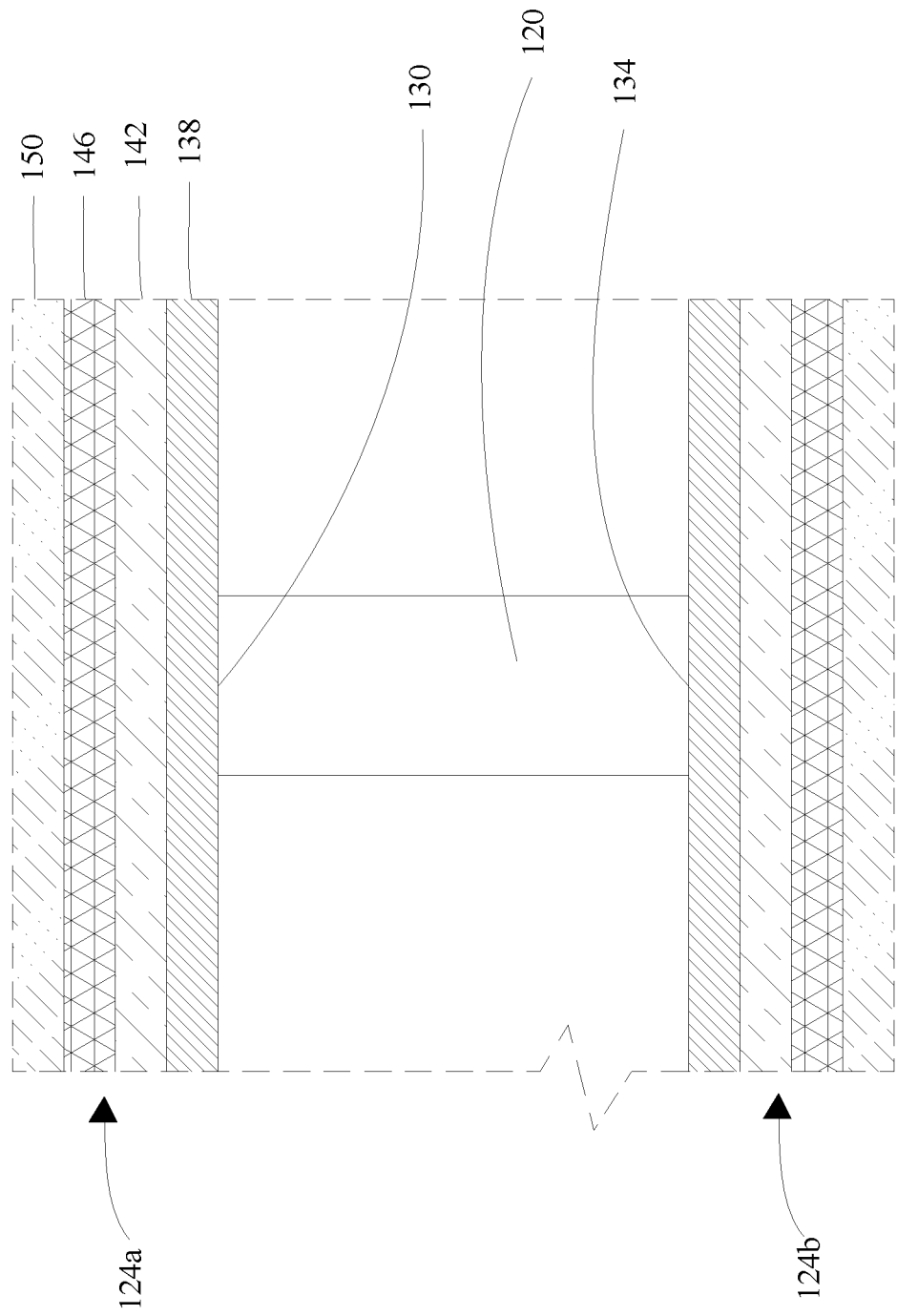
FIG. 1B is an illustration an exemplary embodiment of a firewall.

Now referring to FIG. 1B, a close up of a firewall 124 proximal to a battery cell 120 is shown. Battery cells 120 may be oriented such that a top 130 and/or bottom 134 surface of each battery cell 120 is directed towards firewall 124. In some cases, battery cells 120 may be cylindrical and oriented such that a flat surface of the battery cells 120 is disposed facing the firewall 124. A cylindrical battery cell 120 may have two flat surfaces opposite one another, wherein each flat surface faces a firewall 124. In other embodiments, such as in the case of a pouch battery cell, the top 130 of the battery cell 120 may be where the tabs are located and the bottom 134 of the battery cell 120 may be opposite that of the top 130 of the battery cell 120. Firewall 124 may include a first firewall 124a and a second firewall 124b, wherein the first firewall 124a is located proximal to the top 130 of a battery cell 120 of the plurality of battery cells 120 and the second firewall 124b is located proximal to a bottom 134 of the battery cell 120 of the plurality of battery cells 120.

Still referencing FIG. 1B, firewall 124 may include a stack of materials. As used herein, a "stack of materials" is a set of layers of various materials. For example, firewall 124 may include three layers of materials. In another example, firewall 124 may include four layers of materials. In yet another example, firewall 124 may include 10 layers of materials. Layers of materials may include an ablative material 138, an insulative material 142, a ballistic material 146, and/or a non-flammable material 150. An "ablative material", as used herein, is a material designed to ablate under designed conditions, such as under thermal runaway conditions. "Ablation" is the removal or destruction of something from an object by vaporization, chipping, erosive processes or by other means. Ablative materials may have a large concentration of organic matter that is reduced by fire to ashes. In the case of silicone, organic rubber may surround very finely divided silica dust (up to 480 m$^2$ of combined surface area of all the dust particles per gram of this dust). When the organic rubber is exposed to fire, it may burn to ash and leave behind the silica dust with which the product started. An "insulative material", as used herein, is a material designed to increase thermal and/or electrical resistance by minimizing one or more of conduction, convection, and radiation. Exemplary insulative materials may include fiberglass, aerogels, and the like. A "ballistic material", as used herein, is a material that resists projectiles. Ballistic materials may include, for example, steel, plastic, ceramics, and titanium. Ballistic materials may also include aramid fibers, KEVLAR, and the like. Non-flammable material is a material designed to resist flames and not combust. Non-flammable materials may include refractory, ceramics, glass, and the like. In some embodiments, during thermal runaway, the firewall 124 may be positioned where the heat is most intense. For example, this may be the location where ejecta is most likely to leave a battery cell 120 during thermal runaway. As a non-limiting example, ejecta may most likely come out of the top and/or bottom of a battery cell 120 (such as a cylindrical battery cell or pouch battery cell), thus, this may be where the firewall 124 is located. In some cases, firewall 124 may additionally or alternatively be located proximal a side of a battery cell. In some cases, battery cell side-facing firewall 124 may have parameters which are substantially different than a top/bottom-facing firewall 124. For example without limitation, in some cases a side-facing firewall 124 may include a stack of materials lacking one or more of a ballistic layer, a non-flammable material, an insulation material, and/or an ablative material. Alternatively or additionally, a side-facing firewall 124 may include a similar stack of materials as a top/bottom-facing firewall 124, but with different parameters, for instance less thermal resistance, less flammability resistance, less ballistic resistance, or the like.

With continued reference to FIG. 1B, and in some embodiments, firewall 124 may include a specific orientation of a stack of materials. For example, an ablative material 138 may be the inner most layer, closest to the battery cell 120. This may be the case, as a non-limiting example, so that ablative material 138 may interact with the heat and/or ejecta during a thermal runaway. An insulative material 142 may be the second layer. A non-flammable material 150 may be the third layer. A ballistic material 146 may be the outer layer, such that it may prevent shrapnel from escaping the battery module 104.

With continued reference to FIG. 1B, in some embodiments, firewall 124 may include titanium. In some embodiments, firewall 124 may include carbon fiber. In some cases, firewall 124 may include at least a one of a lithiophilic or a lithiophobic material or layer, configured to absorb and/or repel lithium-based compounds. In some cases, firewall 124 may include a lithiophilic metal coating, such as silver or gold. In some cases, firewall 124 may be flexible and/or rigid. In some cases, firewall 124 may include a sheet, a film, a foil, or the like. Alternatively or additionally, in some cases, firewall 124 may include rigid and/or structural elements, for instance which are solid. Rigid firewall 124 may include metals, composites and the like.

Still referencing FIG. 1B, there may be alternate arrangements of firewalls 124 and battery cells 120. For example, the top 130 of a battery cell 120 may be adjacent to a firewall 124 and the bottom 134 of a battery cell 120 may be adjacent to a cooling plate 108. The bottom of a cooling plate 108 may be adjacent to another battery cell 120, which may be in contact with a second firewall 124 at the bottom 134.

Figure 2:
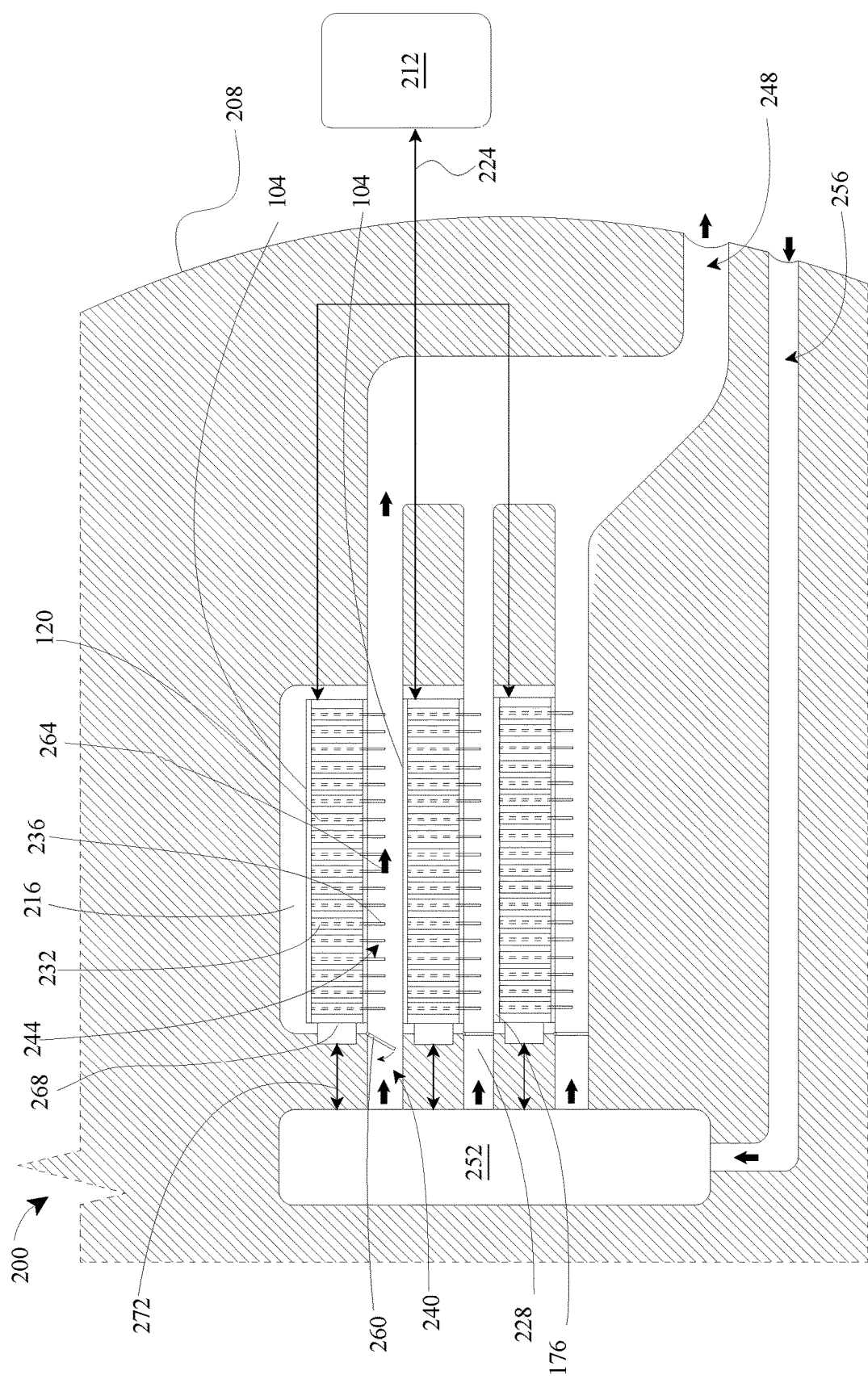
FIG. 2 is an illustration of an exemplary embodiment of a system for venting a battery module with a firewall in one or more aspects of the present disclosure.

Referring now to FIG. 2, is an illustration of a side view of an exemplary embodiment of a system 200 for venting a power source is presented in accordance with one or more embodiments of the present disclosure. In one or more embodiments, system 200 includes a power source, such as a battery pack having a battery module 104, which is configured to provide energy to an electric vehicle 208. System 200 may be configured to monitor and modify a condition of battery module 104 of electric vehicle 208 during a charging process, such as by monitoring a charging condition of battery module 104. For example, and without limitation, a charger 212 may be connected to battery module 104 via an inlet of electric vehicle 208 and a connector of charger 212 to create a charging connection so that energy may be exchanged between battery module 104 and charger 212. As understood by one skilled in the art, charger 212 may include a charging station, a charging grid, an onboard charger, or the like. In one or more embodiments, a battery module 104 may be part of a battery pack 216 having a plurality of battery modules 104. For example, and without limitation, battery pack 216 may include fourteen battery modules. In one or more embodiments, battery module 104 is configured to provide energy to electric vehicle 208 via a power supply connection. For the purposes of this disclosure, a "power supply connection" is an electrical and/or physical communication between a battery module 104 and electric vehicle 208 that powers electric vehicle 208 or subsystems thereof for operation. In one or more embodiments, each battery module 104 may include a battery cell 120. For example, and without limitation, battery module 104 may include a plurality of battery cells 120.

In one or more embodiments, battery pack 216 is configured to be charged and/or recharged by charger 212 via a charging connection 224, which may be between a battery module 104 and charger 212. In some cases, during charging of battery module 104, a charging condition of battery module 104 may be monitored and modified by system 200 to maintain an operational condition of battery module 104 and/or battery cells 120. For example, and without limitation, a charging condition may include a temperature of battery module 104 and/or battery cell 120. In another example, and without limitation, a charging condition may include a cell failure.

Still referencing FIG. 2, and in one or more embodiments, system 200 may be configured to monitor and modify a condition of a battery module 104 during a thermal runaway event. In a non-limiting embodiment, the thermal runaway may include a chain reaction/cascading event within battery module 104. System 200 may be configured to prevent thermal runaway, battery ejecta, or the like from spreading between battery cells 120 creating a cascading event. In an embodiment, thermal runaway temperatures for lithium-metal battery cells are ~1600 C. Thermal runaway temperatures for lithium-ion battery cells are ~800 C.

Still referencing FIG. 2, and in one or more embodiments, system 200 includes a vent 228, which is configured to contain a fluid that traverses therethrough. For the purposes of this disclosure, a "vent" is an opening or a relatively enclosed path that allows a fluid to move therethrough in a desired direction. In some embodiments, vent 228 may be a cooling tube configured to cool a battery cell 120 of a battery module 104. In one or more embodiments, a fluid may include a gas and/or liquid. For example, and without limitation, ambient air from an environment external to electric vehicle 208 may circulate through vent 228 to change a condition of battery module 104, such as lower a temperature of battery module 104 or provide ventilation to remove byproducts from a failure of a battery cell 120. In another example, and without limitation, cooled or heated air may traverse through vent 228 to change the temperature of battery module 104 to a desired amount, such as for example, to an amount that prepares electric vehicle 208 for operation. In some embodiments, fluid in vent 228 may be air, water, coolant, or the like. In one or more embodiments, vent 228 may include a first section 240 and a second section 244. In one or more embodiments, first section 240 may be in fluid communication with second section 244. Thus, fluid moving through first section 240 may move through second section 244, as discussed further below. In one or more embodiments, a fluid may be traversed or displaced within vents 228 by a fan and/or a pump. For example, and without limitation, a pump may be in fluid communication with first section 240 of vent 228, where the pump is configured to displace a fluid through vent 228 so that the fluid is delivered to or removed from a battery module 104. In another example, and without limitation, an electric fan may be positioned at one end of a vent 228 to push or pull a gas along a path of the vent 228. In another embodiment, a fluid may be traversed or displaced within vents 228 passively. For example, and without limitation, a byproduct from a battery module 104 may move along a path of a vent 228 due to, for example, a positioning of the vent 228 that allows ambient air or gravity to apply a force to the byproduct and thus move the byproduct through the vent 228. In one or more embodiments, second section 244 of vent 228 may run along battery module 104. For instance, and without limitation, second section 244 of vent 228 may run below battery module 104, such as, for example, along a base of battery module 104.

Still referencing FIG. 2, vent 228 is located between the plurality of battery cells 120. For example, vent 228 may be disposed such that there are sets of battery cells 120 on each side of vent 228. Specifically, there may be a plurality of battery cells 120 on either side of first section 240 of vent 228.

Still referencing FIG. 2, and in one or more embodiments, system 200 may include tabs 236, where each tab 236 extends from a battery cell 120 of a battery module 104 of a battery pack 216.

Second section 244 of vent 228 may be positioned adjacent to battery module 104 so that tabs 236 may protrude from the base of battery module 104 and into vent 228. In one or more embodiments, tabs 236 may be a conductive tab attached to a battery cell 120. In one or more embodiments, tabs 236 may include a conductive component 232 that is disposed within or along battery cell 120, as discussed further below. In one or more embodiments, tabs 236 may include a material with a high thermal conductivity. For example, and without limitation, tabs 236 may include copper, aluminum, brass, steel, ceramic, and the like. In one or more embodiments, tabs 236 may transmit and/or transfer energy between battery module 104 and/or battery cell 120 and a fluid traversing through second section 244 of vent 228. For example, tabs 236 may transfer energy, such as heat, from a fluid traversing through vent 228 through battery cell 120, thus, changing the temperature of the battery module 104 and/or battery cell 120.

Continuing to reference FIG. 2, and in another instance, and without limitation, second section 244 of vent 228 may be positioned between battery modules 204 if battery pack 216 includes a plurality of battery modules 204. Such an arrangement may allow for a reduction in heat exchange between battery modules 104, such as thermal runaway or controlled changing of the temperature of one battery module 104 but not another, as discussed further in this disclosure. For example, battery modules 104 that are stacked may be separated by a vent 228. In another embodiment, vent 228 may run along the side of battery module 104 and tab 236 of conductive component 232 may extend from a side of battery module 104 and into vent 228. In one or more embodiments, vent 228 may include a plurality of first sections and corresponding second sections, where each vent 228 runs along a battery module 104. In other non-limiting embodiments, vent 228 includes a single first section that is attached to a plurality of second sections. In one or more embodiments, second section 244 of vent 228 may terminate at an opening, such as at an exhaust 248, into an external environment surrounding the electric vehicle 208. For example, and without limitation, byproduct from a failure of a battery cell 120 may be pushed out of second section 244 of vent 228 and out of exhaust 248.

Still referring to FIG. 2, battery cell 120 of battery module 104 may include a conductive component 232, which includes a tab 236 that extends from battery cell 120. More specifically, tab 236 extends from battery module 104 and into vent 228. For example, and without limitation, tab 236 may extend into second section 244 of vent 228. In one or more components, conductive component 232 may include any material with a high thermal conductivity. For example, and without limitation, conductive component 232 may include copper, aluminum, brass, steel, and the like. In one or more embodiments, and without limitation, conductive component 232 may include a backing with a low thermal conductivity that has one or more paths made from materials with high conductivity attached thereto or integrated therein. This may allow for a more precise delivery of thermal energy to desired components of battery cell 120. In one or more embodiments, conductive component 232 may extend throughout battery cell 120; thus, if a fluid circulated through vent 228 is a differing temperature from conductive component 232, conductive tab 236 may transmit the temperature through conductive component 232 which may subsequently change the temperature of battery cell 120. For example, and without limitation, if the temperature of a fluid traversing through vent 228 is higher than conductive component 232, then the passing fluid may increase the temperature of conductive component 232, which in turn raises the temperature of battery cell 120 of battery module 104.

Continuing to reference FIG. 2, and in one or more embodiments, system 200 may include a pump 252, which is in fluid communication with vent 228. For example, and without limitation, pump 252 may be in fluid communication with first section 240 of vent 228. In one or more embodiments, pump 252 is configured to displace a fluid through vent 228 so that the fluid is delivered to or removed away from battery module 104. For instance, and without limitation, pump 252 may move air through an intake 256 and into first section 240. For example, pump 252 may create a vacuum that moves cool ambient air from an external environment through intake 256, into first section 240, and then through second section 244 so that, for example, the cool air may pass adjacent to battery cells 120 and over tabs 236 and thus lower a temperature of battery module 104. In another instance, and without limitation, pump 252 may move air through first section 240, through second section 244, and then out exhaust 248 of second section 244 into an external environment.

For example, and without limitation, pump 252 may push warm air generated by adjacent battery module 104 out of second section 244 and out exhaust 248 of second section 244 to lower a temperature of battery module 104 and, for example, prevent thermal runaway.

In one or more embodiments, system 200 may include a heating component configured to warm a fluid delivered to battery module 104 via vent 228 so as to increase a temperature of battery module 104. For example, and without limitation, heating component may include a heating coil, heater, or the like. In other embodiments, system 200 may include a cooling component configured to cool the fluid delivered to battery module 104 so as to decrease a temperature of battery module 104.

Still referring to FIG. 2, system 200 may include a vent valve 260 moveably connected to vent 228. For example, and without limitation, vent valve 260 may be attached to first section 240 and positioned between first section 240 and second section 244. For example, and without limitation, a vent 228 may include a plurality of vents 228, each positioned between a pair of battery modules 104, where each vent 228 may include a vent valve 260. In one or more embodiments, vent valve 260 is configured to prevent, in a closed position, a fluid from traversing between first section 240 and second section 244 of vent 228. In one or more embodiments, vent valve 260 is configured to allow, in an open position, a fluid to traverse between first section 240 and second section 244 of vent 228. For example, and without limitation, when vent valve 260 is in an open position, air may flow from first section 240 to second section 244 of vent 228. In one or more non-limiting embodiments, pump 252 may move air from first section 240 to second section 244 of vent 228 if vent valve 260 is in an open position. In other non-limiting embodiments, pump 252 cannot move air between first section 240 to second section 244 while vent valve 260 is in the closed position. In one or more embodiments, if electric vehicle 208 includes a plurality of battery modules 104, then each corresponding vent 228 of the battery modules 104 may have a vent valve 260, so that only battery modules 104 that need a charging condition adjustment will have open vent valves 260, as discussed further in this disclosure.

In one or more embodiments, vent 228 may be configured to vent ejecta from battery cell 120. For example, and without limitation, vent 228 may be configured to vent ejecta along a flow path 264. In one or more embodiments, a fluid may traverse along flow path 264, such as, for example, through first section 240 and through second section 244 of vent 228. In one or more non-limiting embodiments, flow path 264 may substantially exclude battery cell 120, for example, of fluids such as gases, liquids, or any material that acts as a gas or liquid, flowing along the flow path 264 and may be cordoned away from contact with surrounding battery cells 120. Vent 228 may include a channel, tube, hose, conduit, or the like suitable for facilitating fluidic communication, such as, for example, with a battery cell 120. In one or more embodiments, vent valve 260 may include a check valve. As used in this disclosure, a "check valve" is a valve that permits flow of a fluid only in certain direction. For instance, a check valve may only allow unidirectional flow of a fluid through vent 228. For example, and without limitation, a check valve may only allow a fluid to flow from first section 240 to second section 244 of vent 228. In some cases, a check valve may be configured to allow flow of fluids substantially only away from battery cell 120, while preventing back flow of vented fluid to other battery cells 120 and/or toward pump 252. In some cases, a check valve may include a duckbill check valve. In some cases, a duckbill check valve may have lips which are substantially in a shape of a duckbill. The lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent 228 may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, a mushroom poppet valve may be loaded against sealing element, for example by way of a compliant element, such as a spring. In some cases, vent valve 260 may include a grated shutter having slats that may be rotated at various angled to achieve a closed position or open position of vent valve 260. According to some embodiments, vent 228 may have a vacuum applied to aid in venting of ejecta, such as via pump 252. Vacuum pressure differential may range from 0.1" Hg to 46" Hg.

In one or more embodiments, vent 228 may allow for removal of ejecta from battery cell 120. In some cases, ejecta may include hot matter, which if left uncontained could transfer heat to other, e.g., neighboring, battery cells 120. Preventing hot ejecta from reaching battery cells 120 may aid in preventing progression of thermal runaway between battery cells 120 within battery pack 216. In some cases, ejecta may include combustible materials, which if left uncontained could settle upon other, e.g., neighboring, battery cells 120. Combustible materials once combustion conditions are met may combust generating an exothermic reaction, which can induce thermal runaway on nearby battery cells 120. Combustion conditions can include presence of oxygen, fuel, spark, flash point, fire point, and/or autoignition temperature. As previously mentioned, vent 228 may provide for ejecta flow along a flow path 264. Vent 228 may include a check valve, which may be configured to allow for a flow fluids in substantially one direction, for example away from battery cell 120. In some cases, vent 228 may be configured to allow for a venting of ejecta from battery cell 120 without substantially any flow of ejecta toward surrounding battery cells 120.

In some embodiments, vent valve 260 may include a direction control valve, such as without limitation a bidirectional value. As used in this disclosure, a "directional control valve," is a valve configured to allow fluid flow into different paths from one or more sources. In some cases a directional control valve may consist of a spool inside a cylinder which is mechanically or electrically actuated. In this case, a position of spool restricts or permits flow, thereby controlling direction of fluid flow. In some cases, a directional control valve may include multiple ports, which may be selectively controlled to facilitate fluidic communication. In some cases, vent valve 260 may have three or more ports thereby allowing for directional (e.g., bidirectional) control of fluidic communication between multiple ports.

In one or more embodiments, vent valve 260 may be actuated by a controller of system 200. For example, and without limitation, system 200 may include a battery management component 268 configured to move vent valve 260. Additional disclosure related to a battery management component can be found in U.S. patent application Ser. No. 17/529,447 entitled "MODULE MONITOR UNIT FOR AN ELECTRIC AIRCRAFT BATTERY PACK AND METHODS OF USE," the entirety of which in incorporated herein by reference.

Figure 3:
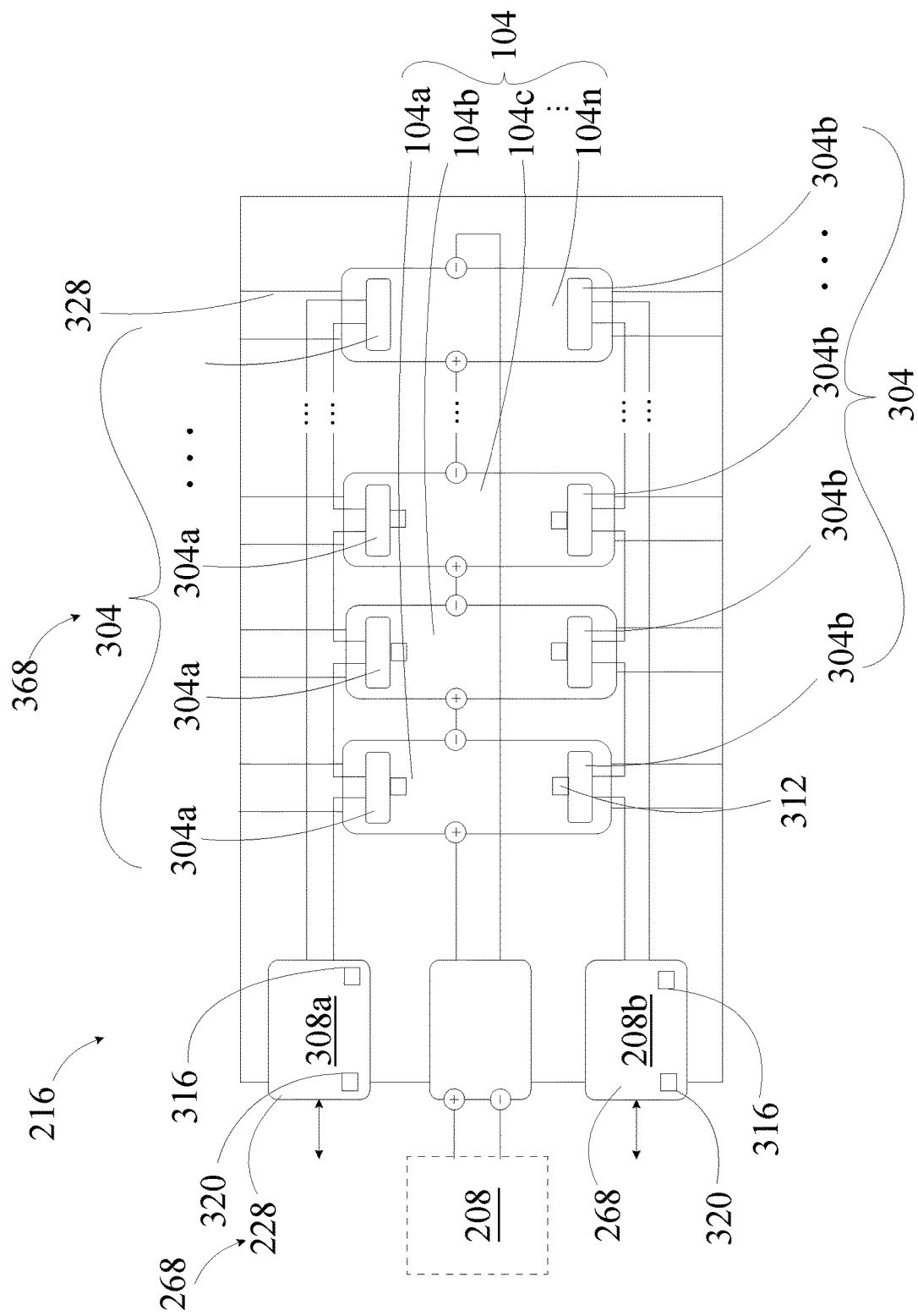
FIG. 3 is a block diagram of an exemplary embodiment of a battery management component in one or more aspects of the present disclosure.

Now referring to FIG. 3, an illustration of a top view of a battery pack 216 with a battery management component 268 is shown in accordance with one or more embodiments of the present disclosure. In one or more embodiments, battery management component 268 may be communicatively connected to battery module 104, pump 252, vent valve 260, and/or charger 212. In one or more embodiments, battery management component 268 may be integrated into battery pack 216 in a portion of battery pack 216 or a subassembly thereof. One of ordinary skill in the art will appreciate that there are various areas in and on a battery pack 216n and/or subassemblies thereof that may include battery management component 268, such as battery modules 104. In one or more embodiments, battery management component 268 may be disposed directly over, adjacent to, facing, and/or near a battery module 104 and specifically at least a portion of battery cell 120. In one or more embodiments, battery management component 264 may communicate with pump 252 via a connection 272, as discussed further in this disclosure.

Still referring to FIG. 3, battery management component 268 may include a module monitor unit (MMU) 304 and a pack monitoring unit (PMU) 308. In one or more embodiments, battery management component 268 may also include a sensor 312. For example, and without limitation, battery management component 268 may include a sensor suite 400 (shown in FIG. 4) having a plurality of sensors. In one or more embodiments, battery management component 268 may include MMU 304, which is mechanically connected and communicatively connected to battery module 104. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMU 304 is configured to detect a condition parameter of battery module 104 of battery pack 216. For the purposes of this disclosure, a "condition parameter" is detected electrical or physical input and/or phenomenon related to a state of battery pack 216. A state of a battery pack 216 may include detectable information related to, for example, a temperature, a moisture level, a humidity, a voltage, a current, vent gas, vibrations, chemical content, or other measurable characteristics of battery pack 216 or components thereof, such as battery module 104 and/or battery cell 120. For example, and without limitation, MMU 304 may detect and/or measure a condition parameter, such as a temperature, of battery module 104. In one or more embodiments, a condition parameter of battery pack 216 may include a condition parameter of a battery module 104 and/or battery cell 120. In one or more embodiments, MMU 304 may include a sensor, which may be configured to detect and/or measure a condition parameter. As used in this disclosure, a "sensor" is a device that is configured to detect an input and/or a phenomenon and transmit information and/or datum related to the detection. A sensor may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio.

In one or more embodiments, MMU 304 is configured to transmit a measurement datum of battery module 104. MMU 304 may generate an output signal that includes a sensor output signal, such as a measurement datum, which includes information regarding detected condition parameter. For the purposes of this disclosure, "measurement datum" is an electronic signal representing information and/or datum of a detected electrical or physical characteristic and/or phenomenon correlated with a condition state of a battery pack 216. For example, measurement datum may include data related to a condition parameter of battery pack 216. In one or more embodiments, measurement datum may be transmitted by MMU 304 to PMU 308 so that PMU 308 may receive measurement datum, as discussed further in this disclosure. For example, MMU 304 may transmit measurement data to a controller 316 of PMU 308.

In one or more embodiments, MMU 304 may include a plurality of MMUs 304. For instance, and without limitation, each battery module 104a-n may include one or more MMUs 304. For example, and without limitation, each battery module 104a-n may include two MMUs 304a,b.

MMUs 304a,b may be positioned on opposing sides of battery module 104. Battery module 104 may include a plurality of MMUs 304 to create redundancy so that, if one MMU 304 fails or malfunctions, another MMU 304 may still operate properly and continue to monitor a corresponding battery module 104. In one or more non-limiting exemplary embodiments, MMU 304 may include mature technology so that there is a low risk. Furthermore, MMU 304 may not include software to, for example, increase reliability and durability of MMU 304 and thus, avoid complications often inherent with using software applications. MMU 304 is configured to monitor and balance all groups of battery cells 120 of battery pack 216 during charging of battery pack 216. For instance, and without limitation, MMU 304 may monitor a temperature of battery module 104 and/or a battery cell 120 of battery module 104. For example, and without limitation, MMU 304 may monitor a temperature of a group of battery cells 120. In another example, and without limitation, MMU 304 may monitor a terminal temperature of battery module 104 to, for example, detect a poor high voltage (HV) electrical connection. In one or more embodiments, an MMU 304 may be indirectly connected to PMU 308. In other embodiments, MMU 304 may be directly connected to PMU 308. In one or more embodiments, MMU 304 may be communicatively connected to an adjacent MMU 304.

Still referring to FIG. 3, battery management component 268 includes PMU 308, which is communicatively connected to MMU 304. In one or more embodiments, PMU 308 includes controller 316, which is configured to receive measurement datum from MMU 304. For example, PMU 308a may receive a plurality of measurement data associated with various states of a battery module 104 from MMU 304a. Similarly, PMU 308b may receive a plurality of measurement data from MMU 304b. In one or more embodiments, PMU 308 may receive measurement datum from MMU 304 via communication component, such as via communicative connections. For example, PMU 308 may receive measurement datum from MMU 304 via an isoSPI transceiver. In one or more embodiments, controller 316 of PMU 308 is configured to identify a charging condition of battery module 104 as a function of measurement datum. For the purposes of this disclosure, a "charging condition" is a state and/or working order of battery pack 216 and/or any components thereof during charging of a battery pack 216. For example, and without limitation, a charging condition may include a state of charge (SOC), a depth of discharge (DOD), a temperature reading, a moisture/humidity level, a gas level, a chemical level, a battery cell failure, or the like.

In one or more embodiments, controller 316 of PMU 308 may be configured to determine a critical event element if charging condition is outside of a predetermined threshold (also referred to herein as a "threshold"). For the purposes of this disclosure, a "critical event element" is a failure and/or critical operating condition of a battery pack and/or components thereof that may be harmful to a battery pack and/or corresponding electric vehicle. For instance, and without limitation, if an identified charging condition, such as a temperature of battery cell 120, does not fall within a predetermined threshold, such as a range of acceptable, operational temperatures of a battery cell 120, then a critical event element is determined by controller 316 of PMU 308. For example, and without limitation, PMU 308 may use measurement datum from MMU 304 to identify a temperature of 95° F. for battery module 104. If the predetermined temperature threshold is, for example, 75° F. to 90° F., then the determined charging condition is outside of the predetermined temperature threshold, such as exceeding the upper threshold of 90° F., and a critical event element is determined by controller 316. As used in this disclosure, a "predetermined threshold" is a limit and/or range of an acceptable quantitative value or representation related to a normal charging condition and/or state of a battery pack 216 and/or components thereof. In one or more embodiments, a charging condition outside of a threshold is a critical charging condition, which triggers a critical event element. A charging condition within the threshold is a normal charging condition, which indicates that a battery module 104 is working properly and no critical event element is determined. For example, and without limitation, if a charging condition of temperature exceeds a predetermined temperature threshold of a battery module 104, then the battery module 104 is considered to be operating at a critical charging condition and may be at risk of overheating and experiencing a catastrophic failure. In one or more embodiments, critical event elements may include overheating, high moisture, cell failure, and the like.

In one or more embodiments, controller 316 of PMU 308 is configured to generate an action command if critical event element is determined by controller 316. For the purposes of this disclosure, an "action command" is a control signal generated by controller 316 that provides instructions related to reparative action needed to prevent damage to a battery module 104 as a result of a critical charging condition of battery module 104 and/or prepare battery module 104 for operation.

Continuing the previously described example above, if an identified charging condition includes a temperature of 95° F., which exceeds a predetermined temperature threshold, then controller 316 may determine a critical event element indicating that battery module 104 is working at a critical temperature level and at risk of catastrophic failure. As a result, controller 316 may generate an action command, which includes: actuating vent valve 260 by opening vent valve 260 and activating pump 252 so that pump 252 may move fluid through vent 228. Furthermore, a heating component or cooling component may be used to raise or lower the temperature of the fluid traversing through vent 228 so that the temperature of the fluid passing over tabs 236 may consequently change the temperature of battery cell 120 to a desired temperature, thus, eliminating the critical event element and/or establishing a normal charging condition of battery module 104.

In one or more embodiments, battery management component 268 may include a plurality of PMUs 308. For instance, and without limitation, battery management component 268 may include a pair of PMUs 308. For example, and without limitation, battery management component 268 may include a first PMU 308a and a second PMU 308b, which are each disposed in or on battery pack 216 and may be physically isolated from each other. "Physical isolation," for the purposes of this disclosure, refer to a first system's components, communicative connection, and any other constituent parts, whether software or hardware, are separated from a second system's components, communicative coupling, and any other constituent parts, whether software or hardware, respectively. Continuing in reference to the non-limiting exemplary embodiment, first PMU 308a and second PMU 308b may perform the same or different functions. For example, and without limitation, first and second PMUs 308a,b may perform the same, and therefore, redundant functions. Thus, if one PMU 308a/b fails or malfunctions, in whole or in part, the other PMU 308b/a may still be operating properly and therefore battery management component 268 may still operate and function properly to manage battery pack 216. One of ordinary skill in the art would understand that the terms "first" and "second" do not refer to either PMU as primary or secondary. In non-limiting embodiments, the first and second PMUs 308a,b, due to their physical isolation, may be configured to withstand malfunctions or failures in the other system and survive and operate. Provisions may be made to shield first PMU 308a from second PMU 308b other than physical location, such as structures and circuit fuses. In non-limiting embodiments, first PMU 308a, second PMU 308b, or subcomponents thereof may be disposed on an internal component or set of components within battery pack 216, such as on a sense board of battery module 104, as discussed further below in this disclosure.

Still referring to FIG. 3, first PMU 308a may be electrically isolated from second PMU 308b. "Electrical isolation", for the purposes of this disclosure, refer to a first system's separation of components carrying electrical signals or electrical energy from a second system's components. First PMU 308a may suffer an electrical catastrophe, rendering it inoperable, and due to electrical isolation, second PMU 308b may still continue to operate and function normally, allowing for continued management of battery pack 216 of electric vehicle 208. Shielding such as structural components, material selection, a combination thereof, or another undisclosed method of electrical isolation and insulation may be used, in non-limiting embodiments. For example, and without limitation, a rubber or other electrically insulating material component may be disposed between electrical components of first and second PMUs 308a,b, preventing electrical energy to be conducted through it, isolating the first and second PMUs 308a,b form each other. Similarly, MMUs 304 may be physically and/or electrically isolated relative to each other and/or PMUs 308 in case of failure of an MMU 304 and/or PMU 308.

Still referring to FIG. 3, MMU 304 may include sensor 312 or sensor suite 400 (FIG. 4) configured to measure physical and/or electrical parameters, such as without limitation temperature, voltage, orientation, or the like, of one or more battery cells 120. MMU 304 and/or a control circuit incorporated therein and/or communicatively connected thereto, may further be configured to detect a measurement datum of each battery cell 120, which controller 316 of PMU 308 may ultimately use to determine a failure within each battery cell 120, such as critical event element. Cell failure may be characterized by a spike in temperature and MMU 304 may be configured to detect that increase. In one or more embodiments, measurement data of MMU 304 may be stored in memory component 320.

In one or more embodiments, PMU 308 may include sensor 312. For example, and without limitation, condition characteristics of battery module 104 may be detected by sensor 312, which may be communicatively connected to MMU 304. Sensor 312 may include a sensor suite 400 or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 312 may be a contact or a non-contact sensor. For example, and without limitation, sensor 312 may be connected to battery module 104 and/or battery cell 120. In other embodiments, sensor 312 may be remote to battery module 104 and/or battery cell 120. Sensor 312 may be communicatively connected to controller 316 of PMU 308 so that sensor 312 may transmit/receive signals to/from controller 316, respectively. Signals, such as signals of sensor 312 and controller 316, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

Referring again to FIG. 3, PMU 308 may include memory component 320, as previously mentioned in this disclosure. In one or more embodiments, memory component 320 may store data for battery pack 216. Data for battery pack 216 may include be generated data, detected data, measured data, inputted data, and the like. For example, measurement datum may be stored in memory component 320. In another example, critical event element and/or corresponding lockout flag may be stored in memory component 320. Data associated with battery pack 216 may also include inputted datum, which may include total flight hours that battery pack 216 and/or electric vehicle 208 have been operating, a flight plan of electric aircraft 208, identification of battery pack 216, verification of battery pack 216, a maintenance history for battery pack 216, specifications of battery pack 216, or the like. In one or more embodiments, maintenance history of battery pack 216 may include mechanical failures and technician resolutions thereof, electrical failures and technician resolutions thereof. Additionally, maintenance history of battery pack 216 may include component failures such that the overall battery pack 216 still functions. In one or more embodiments, memory component 320 may be communicatively connected to sensors, such as sensor 312, that detect, measure, and obtain a plurality of measurements, which may include current, voltage, resistance, impedance, coulombs, watts, temperature, moisture/humidity, or a combination thereof. Additionally or alternatively, memory component 320 may be communicatively connected to a sensor suite consistent with this disclosure to measure physical and/or electrical characteristics. In one or more embodiments, memory component 320 may store data associated with battery pack 216 that includes an upper threshold and a lower threshold of a state and/or condition consistent with this disclosure. In one or more exemplary embodiments, data associated with battery pack 216 may include a moisture-level threshold. The moisture-level threshold may include an absolute, relative, and/or specific moisture-level threshold. In other exemplary embodiments, data associated with battery pack 216 may include a temperature threshold. In other exemplary embodiments, data associated with battery pack 216 may include a high-shock threshold.

In one or more embodiments, memory component 320 may be configured to save measurement datum, operating condition, critical event element, and the like periodically in regular intervals to memory component 320. "Regular intervals," for the purposes of this disclosure, refers to an event taking place repeatedly after a certain amount of elapsed time. In one or more embodiments, PMU 308 may include a timer that works in conjunction to determine regular intervals. In other embodiments, PMU 308 may continuously update operating condition or critical event element and, thus, continuously store data related the information in memory component 320. A timer may include a timing circuit, internal clock, or other circuit, component, or part configured to keep track of elapsed time and/or time of day. For example, in non-limiting embodiments, memory component 320 may save data associated with battery pack 216 every 40 seconds, every minute, every 40 minutes, or another time period according to timer. Additionally or alternatively, memory component 320 may save data associated with battery pack 216 after certain events occur, for example, in non-limiting embodiments, each power cycle, landing of the electric aircraft 208, when battery pack 216 is charging or discharging, a failure oof battery module 104, a malfunction of battery module 104, a critical event element, or scheduled maintenance periods. In non-limiting embodiments, battery pack 216 phenomena may be continuously measured and stored at an intermediary storage location, and then permanently saved by memory component 320 at a later time, for example at a regular interval or after an event has taken place as disclosed hereinabove. Additionally or alternatively, data storage system may be configured to save data associated with battery pack 216 at a predetermined time. "Predetermined time," for the purposes of this disclosure, refers to an internal clock within battery pack 216 commanding memory component 320 to save data associated with battery pack 216 at that time.

In one or more embodiments, controller 316 may include a computing device (as discussed in FIG. 7), a central processing unit (CPU), a microprocessor, a digital signal processor (DSP), an application specific integrated circuit (ASIC), a control circuit, a combination thereof, or the like. In one or more embodiments, output signals from various components of battery pack 216 may be analog or digital. Controller 316 may convert output signals from MMU 304 and/or sensor 312 to a usable form by the destination of those signals. For example, and without limitation, PMU 308 may include a switching regulator that converts power received from battery module 104 of battery pack 216. The usable form of output signals from MMUs and/or sensors, through processor may be either digital, analog, a combination thereof, or an otherwise unstated form. Processing may be configured to trim, offset, or otherwise compensate the outputs of sensor 316. Based on MMU and/or sensor output, controller 316 may determine the output to send to a downstream component. Controller 316 may include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 308 may run state estimation algorithms.

With continued reference to FIG. 3, battery management component 268 may include a memory component 320. In one or more embodiments, memory component 320 may be configured to store datum related to battery pack 216, such as data related to battery modules 204a-n. For example, and without limitation, memory component 320 may store sensor datum, measurement datum, charging condition, critical event element, and the like. Memory component 320 may include a database. Memory component 320 may include a solid-state memory or tape hard drive. Memory component 320 may be communicatively connected to PMU 308 and may be configured to receive electrical signals related to physical or electrical phenomenon measured and store those electrical signals as battery module data. Alternatively, memory component 320 may be a plurality of discrete memory components that are physically and electrically isolated from each other. One of ordinary skill in the art would understand the virtually limitless arrangements of data stores with which battery pack 216 could employ to store battery pack data.

Figure 4:
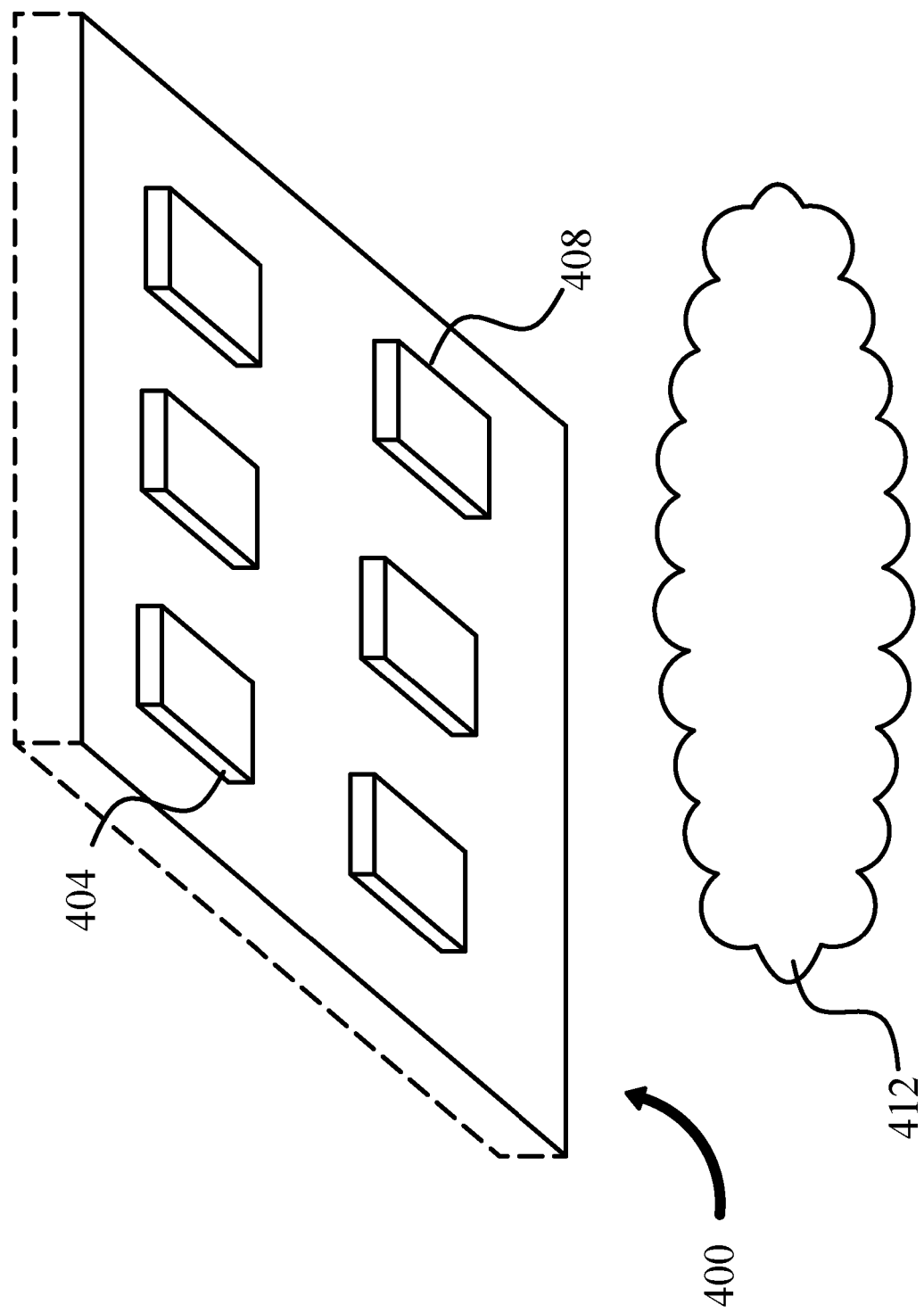
FIG. 4 is an illustration of an exemplary embodiment of a sensor suite in a partial cut-off view in one or more aspects of the present disclosure.

Referring now to FIG. 4, an embodiment of a sensor suite 400 is presented in accordance with one or more embodiments of the present disclosure. The herein disclosed system and method may comprise a plurality of sensors in the form of individual sensors or a sensor suite 400 working in tandem or individually. A sensor suite 400 may include a plurality of independent sensors, as described herein, where any number of the described sensors may be used to detect any number of physical or electrical quantities associated with an electric vehicle power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery module 104 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management component 168 and/or user to detect phenomenon is maintained.

Sensor suite 400 may be suitable for use as sensor 312, as disclosed with reference to FIG. 3 hereinabove. Sensor suite 400 includes a moisture sensor 304. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. Moisture sensor 404 may be a psychrometer. Moisture sensor 404 may be a hygrometer. Moisture sensor 404 may be configured to act as or include a humidistat. A "humidistat," for the purposes of this disclosure, is a humidity-triggered switch, often used to control another electronic device. Moisture sensor 404 may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 4, sensor suite 400 may include electrical sensors 408. Electrical sensors 408 may be configured to measure voltage across a component, electrical current through a component, and resistance of a component. Electrical sensors 408 may include separate sensors to measure each of the previously disclosed electrical characteristics such as voltmeter, ammeter, and ohmmeter, respectively.

Alternatively or additionally, and with continued reference to FIG. 4, sensor suite 400 include a sensor or plurality thereof that may detect voltage and direct the charging of individual battery cells 120 according to charge level; detection may be performed using any suitable component, set of components, and/or mechanism for direct or indirect measurement and/or detection of voltage levels, including without limitation comparators, analog to digital converters, any form of voltmeter, or the like. Sensor suite 400 and/or a control circuit incorporated therein and/or communicatively connected thereto may be configured to adjust charge to one or more battery cells 120 as a function of a charge level and/or a detected parameter. For instance, and without limitation, sensor suite 400 may be configured to determine that a charge level of a battery cell 120 is high based on a detected voltage level of that battery cell 120 or portion of the battery pack 216. Sensor suite 400 may alternatively or additionally detect a charge reduction event, defined for purposes of this disclosure as any temporary or permanent state of a battery cell 120 requiring reduction or cessation of charging; a charge reduction event may include a battery cell 120 being fully charged and/or a battery cell 120 undergoing a physical and/or electrical process that makes continued charging at a current voltage and/or current level inadvisable due to a risk that the battery cell 120 will be damaged, will overheat, or the like. Detection of a charge reduction event may include detection of a temperature, of a battery cell 120 above a threshold level, detection of a voltage and/or resistance level above or below a threshold, or the like. Sensor suite 400 may include digital sensors, analog sensors, or a combination thereof. Sensor suite 400 may include digital-to-analog converters (DAC), analog-to-digital converters (ADC, A/D, A-to-D), a combination thereof, or other signal conditioning components used in transmission of a first plurality of battery pack data to a destination over wireless or wired connection.

With continued reference to FIG. 4, sensor suite 400 may include temperature sensors, such as thermocouples, thermistors, thermometers, passive infrared sensors, resistance temperature sensors (RTDs), semiconductor based integrated circuits (IC), a combination thereof or another undisclosed sensor type, alone or in combination. "Temperature," for the purposes of this disclosure, and as would be appreciated by someone of ordinary skill in the art, is a measure of the heat energy of a system. Temperature, as measured by any number or combinations of sensors present within sensor suite 400, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 4, sensor suite 400 may include a sensor configured to detect gas that may be emitted during or after a failure of a battery call 120. "Cell failure," for the purposes of this disclosure, refers to a malfunction of a battery cell 120, which may be an electrochemical battery cell, which renders the battery cell 120 inoperable for its designed function, namely providing electrical energy to at least a portion of electric aircraft 208. Byproducts 412 of battery cell failure may include gaseous discharge including oxygen, hydrogen, carbon dioxide, methane, carbon monoxide, a combination thereof, or another undisclosed gas, alone or in combination. Further the sensor configured to detect vent gas from electrochemical battery cells may comprise a gas detector. For the purposes of this disclosure, a "gas detector" is a device used to detect a gas is present in an area. Gas detectors, and more specifically, the gas sensor that may be used in sensor suite 400, may be configured to detect combustible, flammable, toxic, oxygen depleted, a combination thereof, or another type of gas alone or in combination. The gas sensor that may be present in sensor suite 400 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 400 may include sensors that are configured to detect non-gaseous byproducts 412 of battery cell failure including, in non-limiting examples, liquid chemical leaks including aqueous alkaline solution, ionomer, molten phosphoric acid, liquid electrolytes with redox shuttle and ionomer, and salt water, among others. Sensor suite 400 may include sensors that are configured to detect non-gaseous byproducts 412 of battery cell failure including, in non-limiting examples, electrical anomalies as detected by any of the previous disclosed sensors or components.

With continued reference to FIG. 4, sensor suite 400 may be configured to detect events where temperature nears an upper voltage threshold or lower voltage threshold. The upper temperature threshold may be stored in memory component 320 for comparison with an instant measurement taken by any combination of sensors present within sensor suite 400. The upper temperature threshold may be calculated and calibrated based on factors relating to the health of battery cell 120, maintenance history, location within battery pack 216 designed application, and type, among others. Sensor suite 400 may measure temperature at an instant, over a period of time, or periodically. Sensor suite 400 may be configured to operate at any of these detection modes, switch between modes, or simultaneous measure in more than one mode. In one or more exemplary embodiments, PMU 308 may determine, using sensor suite 400, a critical event element where temperature nears the lower temperature threshold. The lower temperature threshold may indicate battery pack 216 is not at an optimal temperature for operation, such as flight for electric aircraft 208. PMU 308 may determine through sensor suite 400 critical event elements where temperature exceeds the upper and lower temperature threshold. Events where temperature exceeds the upper and lower temperature threshold may indicate battery cell failure or electrical anomalies that could lead to potentially dangerous situations for electric vehicle 208 and personnel that may be present in or near its operation. Similarly, upper and lower thresholds may be used to determine a critical event element for charging conditions such as battery module 104 humidity level and battery cell failure that produces byproduct.

In some cases, sensor suite 400 may communicate by way of at least a conductor, such as within limitation a control signal conductor. Alternatively and/or additionally, in some cases, sensor suite 400 may be communicative by at least a network, for example any network described in this disclosure including wireless (Wi-Fi), controller area network (CAN), the Internet, and the like. A sensor suite may include a plurality of independent sensors, as described herein, where any number of the described sensors may be used to detect any number of physical or electrical quantities associated with a vehicle battery or an electrical energy storage system, such as without limitation charging battery. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 216 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of controller and/or user to detect phenomenon is maintained.

With continued reference to FIG. 4, in some cases, sensor suite 400 may include a swell sensor configured to sense swell, pressure, or strain of at least a battery cell 120. In some cases, battery cell swell, pressure, and/or strain may be indicative of an amount of gases and/or gas expansion within a battery cell 120. Battery swell sensor may include one or more of a pressure sensor, a load cell, and a strain gauge. In some cases, battery swell sensor may output a battery swell signal that is analog and requires signal processing techniques. For example, in some cases, wherein battery swell sensor includes at least a strain gauge, battery swell signal may be processed and digitized by one or more of a Wheatstone bridge, an amplifier, a filter, and an analog to digital converter. In some cases, battery sensor signal may include battery swell signal.

Figure 5A:
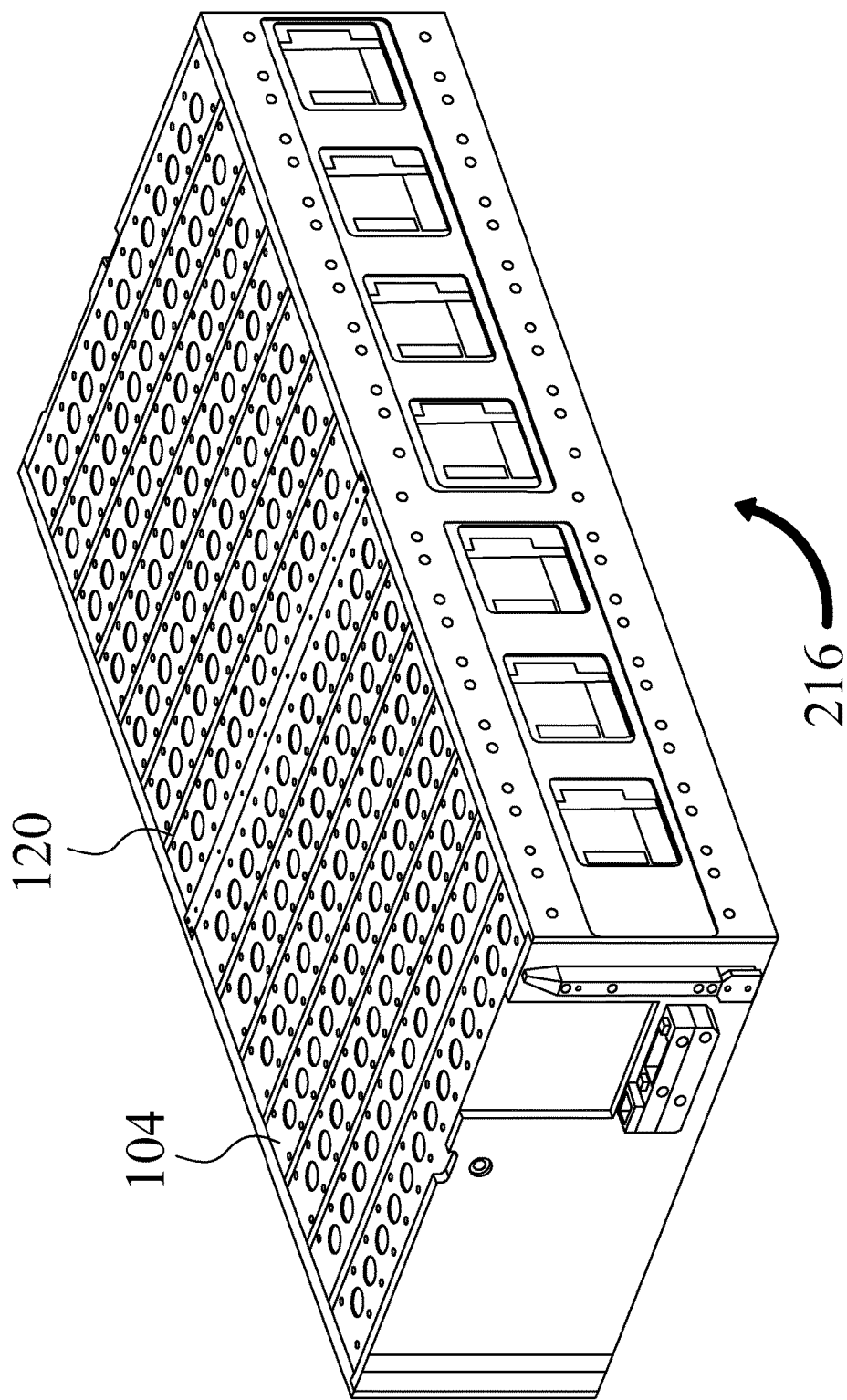
FIGS. 5A and 5B are illustrations of exemplary embodiments of battery pack configured for use in an electric aircraft in isometric view in accordance with one or more aspects of the present disclosure.
Figure 5B:
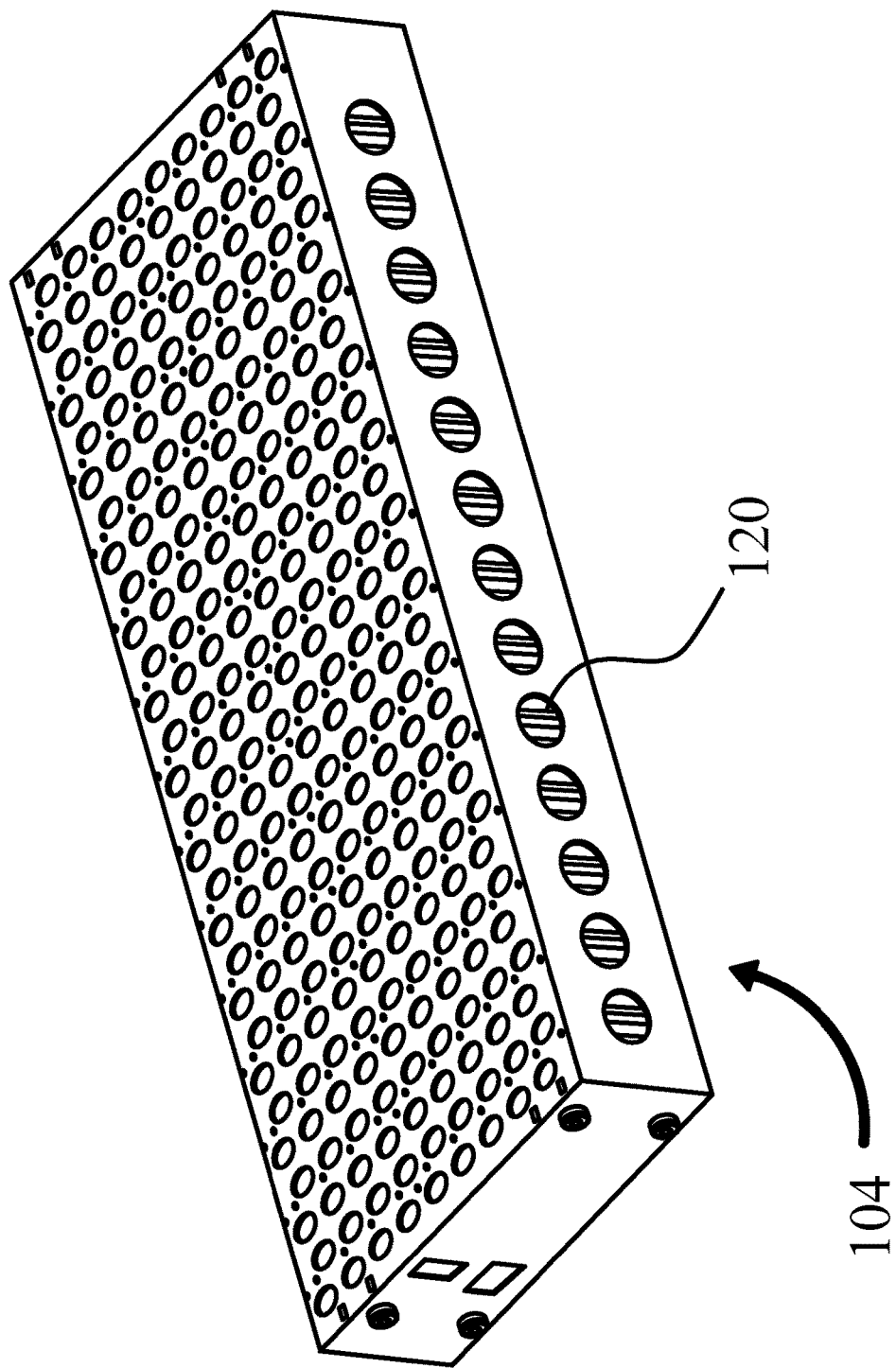

Now referring to FIGS. 5A and 5B, an exemplary embodiment of an eVTOL aircraft battery pack 216 is illustrated in accordance with one or more embodiments of the present disclosure. Battery pack 216 is a power source that may be configured to store electrical energy in the form of a plurality of battery modules 104 which themselves include of a plurality of battery cells 120. These battery cells 120 may utilize electrochemical cells, galvanic cells, electrolytic cells, fuel cells, flow cells, pouch cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell 120 may when used in conjunction with other cells, be electrically connected in series, in parallel or a combination of series and parallel. Series connection includes wiring a first terminal of a first battery cell 120 to a second terminal of a second battery cell 120 and further configured to include a single conductive path for electricity to flow while maintaining the same current (measured in Amperes) through any component in the circuit. A battery cell 120 may use the term "wired," but one of ordinary skill in the art would appreciate that this term is synonymous with "electrically connected," and that there are many ways to couple electrical elements like battery cells together. An example of a connector that does not include wires may be prefabricated terminals of a first gender that mate with a second terminal with a second gender. Battery cells 120 may be wired in parallel. Parallel connection includes wiring a first and second terminal of a first battery cell 120 to a first and second terminal of a second battery cell 120 and further configured to include more than one conductive path for electricity to flow while maintaining the same voltage (measured in Volts) across any component in the circuit. Battery cells 120 may be wired in a series-parallel circuit which combines characteristics of the constituent circuit types to this combination circuit. Battery cells 120 may be electrically connected in a virtually unlimited arrangement which may confer onto the system the electrical advantages associated with that arrangement such as high-voltage applications, high-current applications, or the like. In an exemplary embodiment, and without limitation, battery pack 216 include 296 battery cells 120 in series and 28 battery cells 120 in parallel. This is, as someone of ordinary skill in the art would appreciate, is only an example and battery pack 216 may be configured to have a near limitless arrangement of configuration of battery cells. 120 Battery pack 216 may be designed to the Federal Aviation Administration (FAA)'s Design Assurance Level A (DAL-A), using redundant DAL-B subsystems.

With continued reference to FIGS. 5A and 5B, battery pack 216 may include a plurality of battery modules 204. Battery modules 204 may be wired together in series and in parallel. Battery pack 216 may include a center sheet which may include a thin barrier. The barrier may include a fuse connecting battery modules 104 on either side of the center sheet. The fuse may be disposed in or on the center sheet and configured to connect to an electric circuit comprising a first battery module 104 and therefore battery cells 120. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof.

Battery pack 216 may also include a side wall includes a laminate of a plurality of layers configured to thermally insulate the plurality of battery modules 104 from external components of battery pack 216. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules 104 from external components of battery pack 216 and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

With continued reference to FIGS. 5A and 5B, battery pack 216 may also include an end panel including a plurality of electrical connectors and further configured to fix battery pack 216 in alignment with at least the side wall. End panel may include a plurality of electrical connectors of a first gender configured to electrically and mechanically connect to electrical connectors of a second gender. The end panel may be configured to convey electrical energy from battery cells 120 to at least a portion of an eVTOL aircraft, for example, using a high voltage disconnect. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of end the panel may be mechanically coupled to a second end of a second side wall in a similar or the same mechanism.

With continued reference to FIGS. 5A and 5B, sensor suite 400 may be disposed in or on a portion of battery pack 216 near battery modules 104 or battery cells 120. In one or more embodiments, PMU 308 may be configured to communicate with an electric aircraft, such as a flight controller of electric vehicle 208, using a controller area network (CAN), such as by using a CAN transceiver. In one or more embodiments, a controller area network may include a bus. A bus may include an electrical bus. Bus may refer to power busses, audio busses, video busses, computing address busses, and/or data busses. Bus may be additionally or alternatively responsible for conveying electrical signals generated by any number of components within battery pack 216 to any destination on or offboard an electric aircraft. Battery management component 268 may include wiring or conductive surfaces only in portions required to electrically couple bus to electrical power or necessary circuits to convey that power or signals to their destinations.

Outputs from sensors or any other component(s) present within system may be analog or digital. Onboard or remotely located processors can convert those output signals from sensor suite 400 to a usable form by the destination of those signals. The usable form of output signals from sensors, through processor may be either digital, analog, a combination thereof or an otherwise unstated form. Processing may be configured to trim, offset, or otherwise compensate the outputs of sensor suite 400. Based on sensor output, the processor can determine the output to send to downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components.

With continued reference to FIGS. 5A and 5B, any of the disclosed components or systems, namely battery pack 216, PMU 308, and/or battery cell 120 may incorporate provisions to dissipate heat energy present due to electrical resistance in integral circuit. Battery pack 216 includes one or more battery modules 104 wired in series and/or parallel. The presence of a voltage difference and associated amperage inevitably will increase heat energy present in and around battery pack 216 as a whole. The presence of heat energy in a power system is potentially dangerous by introducing energy possibly sufficient to damage mechanical, electrical, and/or other systems present in at least a portion of an electric aircraft. Battery pack 216 may include mechanical design elements, one of ordinary skill in the art, may thermodynamically dissipate heat energy away from battery pack 216. The mechanical design may include, but is not limited to, slots, fins, heat sinks, perforations, a combination thereof, or another undisclosed element.

Heat dissipation may include material selection beneficial to move heat energy in a suitable manner for operation of battery pack 216. Certain materials with specific atomic structures and therefore specific elemental or alloyed properties and characteristics may be selected in construction of battery pack 216 to transfer heat energy out of a vulnerable location or selected to withstand certain levels of heat energy output that may potentially damage an otherwise unprotected component. For example, and without limitation, conductive component 232 and tab 236 may be include materials beneficial in heat dissipation. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack 216 may include similar or identical features and materials ascribed to battery pack 216 in order to manage the heat energy produced by these systems and components.

According to embodiments, the circuitry disposed within or on battery pack 216 may be shielded from electromagnetic interference. The battery elements and associated circuitry may be shielded by material such as mylar, aluminum, copper a combination thereof, or another suitable material. The battery pack 216 and associated circuitry may include one or more of the aforementioned materials in their inherent construction or additionally added after manufacture for the express purpose of shielding a vulnerable component. The battery pack 216 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

In one or more embodiments, battery cells 120 may include pouch cells. Pouch cells may include lithium (Li) ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. In one or more embodiments pouch cells may include lead-based batteries, such as without limitation, lead acid batteries and lead carbon batteries. Pouch cells may include lithium sulfur batteries, magnesium ion batteries, and/or sodium ion batteries. Battery module 104 may include, without limitation, batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery modules may include solid state batteries or supercapacitors or another suitable energy source. Battery module may be primary or secondary or a combination of both. Additional disclosure related to batteries and battery modules may be found in co-owned U.S. patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patents application Ser. Nos. 16/948,140 and 16/590,496 respectively; the entirety of both applications are incorporated herein by reference.

Figure 6:
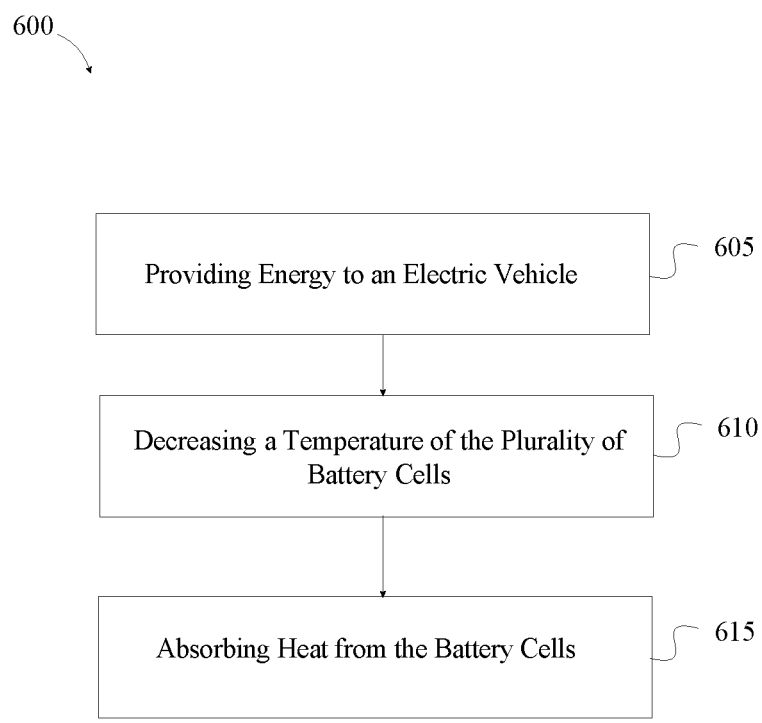
FIG. 6 is a flow chart of an exemplary embodiment of a method of venting a battery module in one or more aspects of the present disclosure.

Referring now to FIG. 6, a flow chart showing an exemplary method 600 of venting a power source in accordance with one or more embodiments of the present disclosure is shown. Step 605 of method 600 includes providing energy, by a battery module 104 comprising a plurality of battery cells 120, to an electric vehicle 208. This step may be implemented in accordance with FIGS. 1-5.

Step 610 of method 600 includes containing a fluid that traverses therethrough by a vent 228 located between the plurality of battery cells 120. The vent 228 includes a first section 240 and a second section 244 that runs along the battery module 104 and is in fluid communication with the first section 240 of the vent 228, wherein the fluid traverse from the first section 240 of the vent 228 to the second section 244 of the vent 228. The fluid within the vent 228 may be configured to decrease a temperature of the plurality of battery cells 120 within the battery module 104. A pump 252 may be in fluid communication with the first section of the vent 228, wherein the pump 252 may be configured to displace the fluid through the vent 228 so that the fluid is delivered to or from the battery module 104. An exhaust 248 may be in fluid communication with the second section 244 of vent 228, wherein the exhaust 248 may be configured to expel the fluid that traverses through the second section 244 into an environment external to the electric vehicle 208. The vent 228 may be configured to deliver ambient air from the external environment to the battery module 104 via the pump 252. This step may be implemented in accordance with FIGS. 1-5.

Step 615 of method 600 includes absorbing heat, by a firewall 124 located proximal to the plurality of battery cells 120, from the battery cells 120. Firewall 124 may be located proximal to the top 130 and bottom 134 of a battery cell 120. Firewall 124 may include a stack of materials. Stack of materials may include an ablative material, insulative material, ballistic material, and/or fire-resistant material. This step may be implemented in accordance with FIGS. 1-5.

Figure 7:
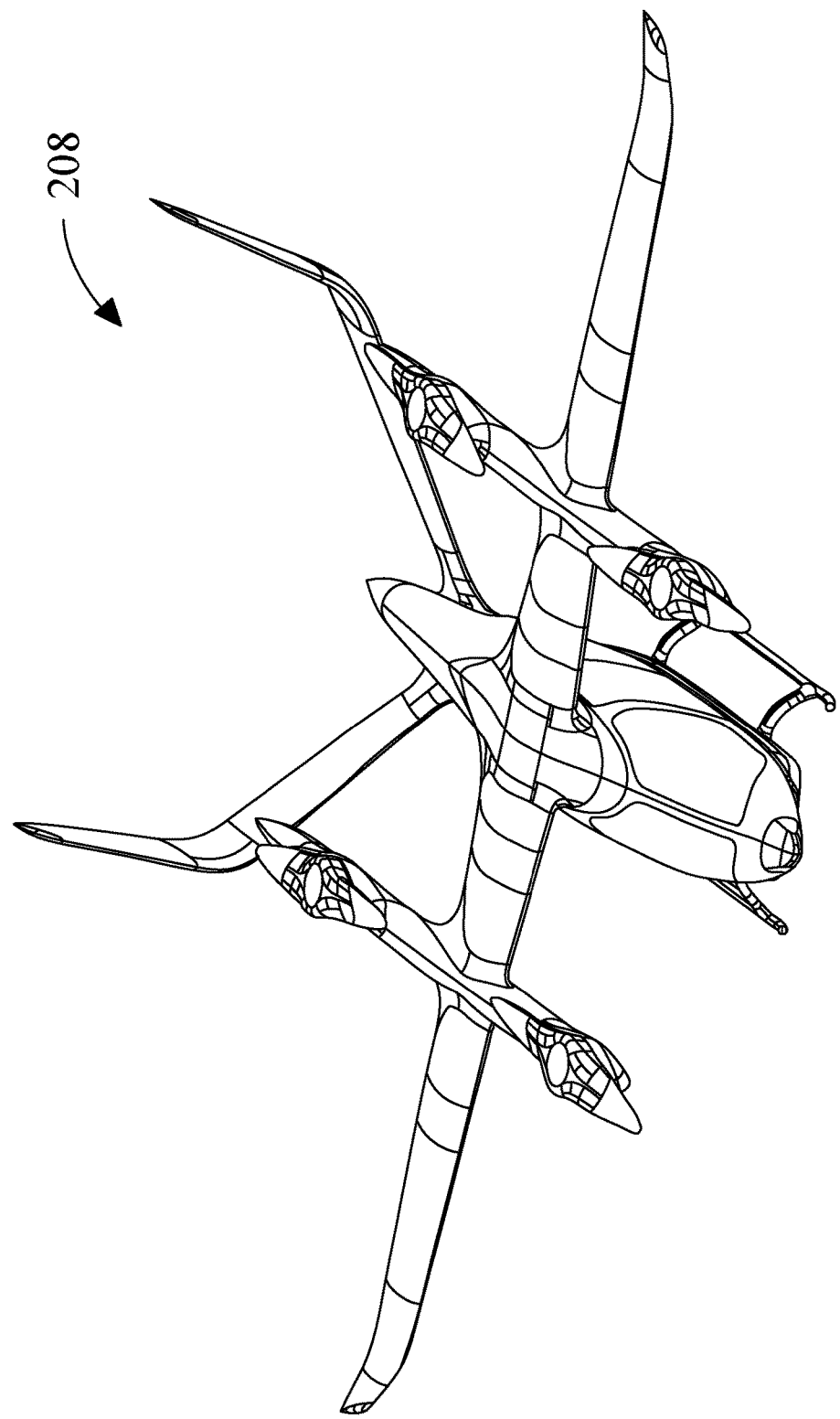
FIG. 7 is an illustration of an embodiment of an electric aircraft in one or more aspects of the present disclosure.

Referring now to FIG. 7, an exemplary embodiment of an electric vehicle 208 is presented in accordance with one or more embodiments of the present disclosure. Electric vehicle 208 (as discussed in FIG. 1) may include an electric aircraft as shown in FIG. 7. An electric aircraft may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
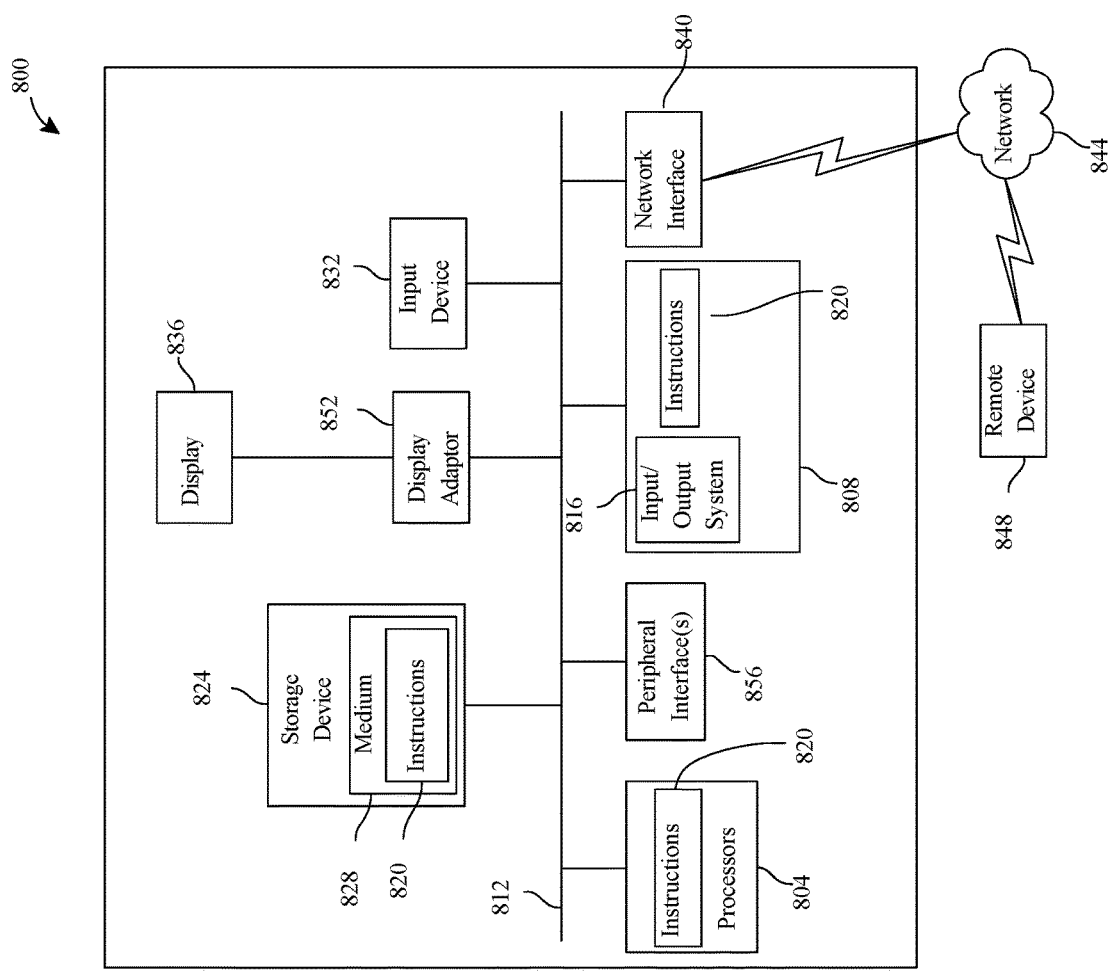
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 894 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system. 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. A battery module, comprising:
   a plurality of battery cells configured to provide energy to an electric vehicle; and
   a firewall, comprising:
      a first firewall portion, wherein the first firewall portion is adjacent a first side of the plurality of battery cells and configured to contain heat from the plurality of battery cells and wherein the first firewall portion comprises a first number of layers in a first stack of materials, the first stack of materials including:
         an inner layer including an ablative material, adjacent the first side of the plurality of batteries,
         an outer layer including a ballistic material, over the inner layer, and
         a lithiophilic coating on the outer layer, wherein the lithiophilic coating remains lithiophilic after a failure of one or more of the plurality of battery cells; and
      a second firewall portion, wherein the second firewall portion is adjacent a second side of the plurality of battery cells, wherein the second firewall portion comprises a second number of layers in a second stack of materials, and wherein the second number of layers is less than the first number of layers.

2. The battery module of claim 1, further comprising a cooling plate located between the plurality of battery cells and configured to decrease a temperature of the plurality of battery cells.

3. The battery module of claim 2, wherein the cooling plate comprises a cooling tube, and wherein the cooling tube is configured to facilitate a flow of fluid between the plurality of battery cells.

4. The battery module of claim 1, wherein the firewall is arranged to intercept ejecta emitted from the plurality of battery cells.

5. The battery module of claim 1, wherein the first and second stacks of materials comprise at least one of an ablative material, an insulative material, a ballistic material, and a non-flammable material.

6. The battery module of claim 1, wherein the first firewall is adjacent a top of the plurality of battery cells and the second firewall is adjacent a bottom of the plurality of battery cells.

7. The battery module of claim 1, wherein the first firewall is adjacent a top of the plurality of battery cells and the second firewall is adjacent a side of the plurality of battery cells.

8. The battery module of claim 1, wherein the electric vehicle comprises an electric vertical takeoff and landing (eVTOL) aircraft.

9. The battery module of claim 1, wherein the plurality of battery cells comprises pouch battery cells or cylindrical battery cells.

10. A method for containing a battery module of an electric vehicle, the battery module including a plurality of battery cells, comprising:
    positioning a firewall adjacent the plurality of battery cells, wherein the firewall comprises:
       a first firewall portion, wherein the first firewall portion is adjacent a first side of the plurality of battery cells and configured to contain heat from the plurality of battery cells, and wherein the first firewall portion comprises a first number of layers in a first stack of materials, the first stack of materials including:
          an inner layer including an ablative material, adjacent the first side of the plurality of batteries,
          an outer layer including a ballistic material, over the inner layer, and
          a lithiophilic coating on the outer layer, wherein the lithiophilic coating remains lithiophilic after a failure of one or more of the plurality of battery cells and
       a second firewall portion, wherein the second firewall portion is adjacent a second side of the plurality of battery cells, wherein the second firewall comprises a second number of layers in a second stack of materials, and wherein the second number of layers is less than the first number of layers.

11. The method of claim 10, further comprising decreasing, by a cooling plate located between the plurality of battery cells, a temperature of the plurality of battery cells.

12. The method of claim 11, wherein the cooling plate comprises a cooling tube, and wherein the cooling tube is configured to facilitate a flow of fluid between the plurality of battery cells.

13. The method of claim 10, wherein the firewall is arranged to intercept ejecta emitted from the plurality of battery cells.

14. The method of claim 10, wherein the first and second stacks of materials comprise at least one of an ablative material, an insulative material, a ballistic material, and a non-flammable material.

15. The method of claim 10, wherein the first firewall is adjacent a top of the plurality of battery cells and the second firewall is adjacent a bottom of the plurality of battery cells.

16. The method of claim 10, wherein the first firewall is adjacent a top of the plurality of battery cells and the second firewall is adjacent a side of the plurality of battery cells.

17. The method of claim 10, wherein the electric vehicle comprises an electric vertical takeoff and landing (eVTOL) aircraft.

18. The method of claim 10, wherein the lithiophilic coating includes at least one of gold or silver.

19. The battery module of claim 1, wherein the lithiophilic coating includes at least one of gold or silver.

20. A battery module, comprising:
a plurality of battery cells configured to provide energy to an electric vertical takeoff and landing (eVTOL) aircraft; and
a firewall, comprising:
 a first firewall portion, wherein the first firewall portion is adjacent a first side of the plurality of battery cells and configured to contain heat from the plurality of battery cells and wherein the first firewall portion comprises a first number of layers in a first stack of materials, the first stack of materials including:
  an inner layer including an ablative material, adjacent the first side of the plurality of batteries,
  an outer layer including a ballistic material, over the inner layer, and
  a lithiophilic coating on the outer layer, wherein the lithiophilic coating includes at least one of gold or silver and remains lithiophilic after a failure of one or more of the plurality of battery cells; and
 a second firewall portion, wherein the second firewall portion is adjacent a second side of the plurality of battery cells, wherein the second firewall portion comprises a second number of layers in a second stack of materials.

* * * * *